United States Patent

Bernard et al.

[11] Patent Number: 5,176,729
[45] Date of Patent: Jan. 5, 1993

[54] METHOD OF PRODUCING FIBERS BY INTERNAL CENTRIFUGATION AND THE APPLICATION OF THE SAID METHOD TO THE DRAWING OUT OF CERTAIN GLASSES INTO FIBERS

[75] Inventors: Jean-Luc Bernard; Guy Berthier, both of Clermont, France; Hans Furtak, D-Speyer am Rhein, Fed. Rep. of Germany; Michel Opozda, Creil, France

[73] Assignee: Isover Saint-Gobain, Courbevoie, France

[21] Appl. No.: 783,894

[22] Filed: Oct. 29, 1991

[30] Foreign Application Priority Data

Oct. 29, 1990 [FR] France ................. 90 13354

[51] Int. Cl.⁵ ............................................. C03B 37/04
[52] U.S. Cl. ........................................... 65/8; 65/6
[58] Field of Search ........................... 65/6, 8, 12, 14

[56] References Cited

U.S. PATENT DOCUMENTS

| | | | |
|---|---|---|---|
| 2,624,912 | 1/1953 | Heymes et al. | 65/6 |
| 3,227,536 | 1/1966 | Firnhaber | 65/6 X |
| 3,785,791 | 1/1974 | Perry | 65/14 |
| 3,928,009 | 12/1975 | Perry | 65/14 |
| 4,058,386 | 11/1977 | Faulkner et al. | 65/6 |
| 4,203,747 | 5/1980 | Fezenko | 65/6 |
| 4,534,779 | 8/1985 | Herschler | 65/6 |
| 4,627,868 | 12/1986 | Kaveh | 65/6 |
| 4,689,061 | 8/1987 | Britts et al. | 65/6 |
| 4,756,732 | 7/1988 | Barthe et al. | 65/6 |
| 5,015,278 | 5/1991 | Lee | 65/6 |

Primary Examiner—Robert L. Lindsay
Attorney, Agent, or Firm—Oblon, Spivak, McClelland, Maier & Neustadt

[57] ABSTRACT

Fibers are drawn out by maintaining a temperature gradient between the interior and exterior walls of the peripheral band of a centrifuge. The peripheral band is made from a material having a thermal conductivity below 20 $Wm^{-1}C^{-1}$ at 1000° C. Application to the drawing out of fibers from glasses having a working range less than 100° C. wide.

8 Claims, 2 Drawing Sheets

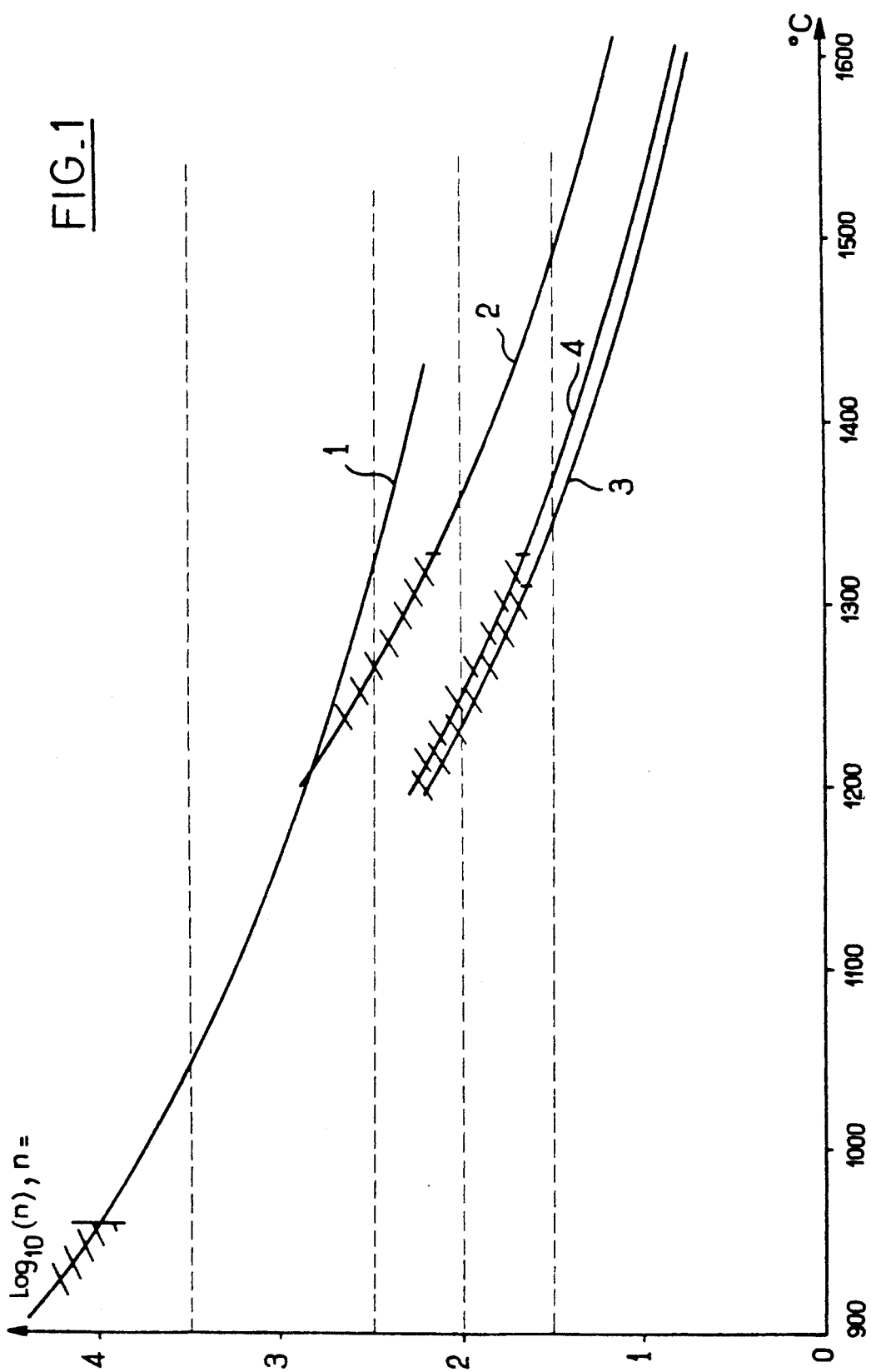

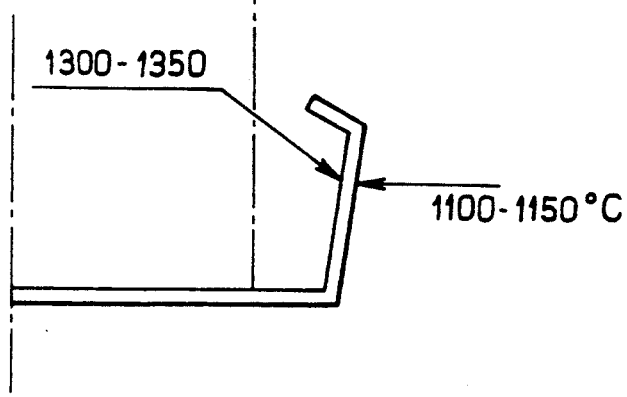
FIG_2
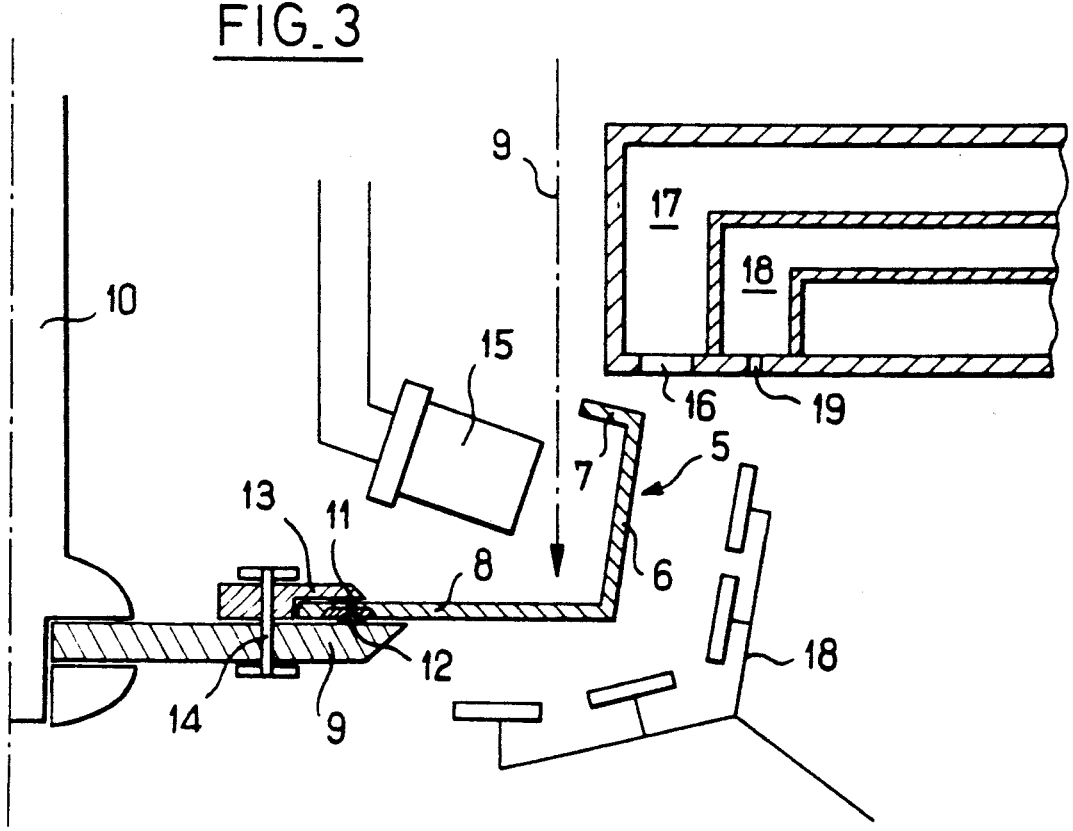
FIG_3

METHOD OF PRODUCING FIBERS BY INTERNAL CENTRIFUGATION AND THE APPLICATION OF THE SAID METHOD TO THE DRAWING OUT OF CERTAIN GLASSES INTO FIBERS

BACKGROUND OF THE INVENTION

1. Field of the Invention

The present invention relates to techniques for producing fibers from a thermoplastics material having a high melting point, for example of the glass or basalt type. More particularly, the invention relates to a development in so-called internal centrifugation methods of drawing out fibers in which the material, in the molten state, is poured into a centrifuge rotating at high speed, the periphery of which is provided with a vast number of orifices through which the material escapes in the form of filaments which are then broken and possibly drawn out by concentric gaseous currents emitted parallel with the axis of rotation of the centrifuge. The invention relates likewise to an application of the method involving drawing out of fibers from relatively hard glasses for which the temperature corresponding to a viscosity appropriate to fiber drawing is close to their devitrification temperature.

2. Description of the Related Art

Over and above a few production units employing purely aerodynamic fiber drawing methods, most mineral wool production is carried out by centrifugation. The first techniques developed at the beginning of the century operated by molten material being poured onto an element rotating at high speed, the molten material becoming detached from the rotating element and being partially converted to fibers. These fiber drawing techniques, still referred to as external centrifugation methods, may be carried out with any type of material, particularly with materials having a high melting point such as basaltic glasses, because the rotating means can be cooled by an internal circulation of water or may be made of a refractory material having no pierced orifices. Furthermore, drawing is virtually instantaneous which makes it possible to use materials having a very high rate of devitrification at temperatures close to the fiber drawing temperature.

Conditioning of the molten glass need not be very elaborate. In other words this method allows melting without plaining, and quite possibly with a few pockets of non-molten material and with a composition which is not strictly constant over any period of time. However, this freedom is bought at the expense of a deterioration in the quality of the fibers and therefore the method cannot be used as widely as would be desired. Furthermore, the stream of molten material which falls onto the centrifuge upsets the drawing conditions so that the treatment undergone by two adjacent filaments may vary widely, which is of course reflected in the final appearance of the product which thus may have a wide diversity of fibers.

Another drawback is the fact that external centrifugation always results in a high level of non-fibered material, which reduces the heat and sound insulating properties of the products and for a given insulation situation results in denser products in that they comprise a considerable proportion of particles which do not contribute to the insulating capacity. In addition, these unfibered materials render the wool dusty and rough to the touch. The result is that external centrifugation techniques are no longer used nowadays except for glass compositions having a very high melting point, classified as hard glasses, for which the fiber drawing range is particularly narrow.

For the "finer" and softer glasses, the fiber drawing techniques systematically employed involve the internal centrifugation outlined hereinabove which advantageously results in a virtual absence of non-fibered material, longer fibers which impart increased resilience to the end product due to better interlocking of the fibers and greater accuracy with regard to the diameter of the fibers produced.

But in order to carry out such internal centrifugation, it is vital that the glass exhibit a satisfactorily rheological behavior. In the first place, the glass must be able to assume such a state that it can be drawn out, the diameter of the centrifuge orifices being of the order of a millimeter or, at the finest, a few tenths of a millimeter while that of the fibers produced must be of the order of a few microns. The filaments which escape from the centrifuge must therefore be thinned out by a minimum factor of one hundred. If the temperature of the glass is too high or in other words if the glass is too fluid, the fibers cannot be drawn out and in the end, due to the surface tension, droplets and not fibers will form (drop resolution temperature).

To this first limitation on the definition of the level of formation must be added the problem of devitrification, in that the glass must not be placed under conditions where it crystallizes at a sufficiently high rate, taking into account its dwell time in the centrifuge, a period of time with no common measure with the contact time between the glass and the rotating means in the case of fiber drawing by external centrifugation. The range of working temperatures is therefore likewise limited by the liquidus temperature (temperature corresponding to zero crystallization rate for a glass which is in thermal balance), or rather according to the usage in this art, by the higher devitrification temperature (the temperature corresponding to complete dissolution of the crystals in 30 minutes, measured on a previously devitrified glass). Subsequently, therefore, we will employ the term "working range" to define the range of temperatures at which fiber drawing is possible.

With the glasses currently used in internal centrifugation, the upper devitrification temperature is below the temperature corresponding to the highest acceptable viscosity for fiber drawing, and therefore the range of working temperatures is not, or is only very slightly, reduced by the devitrification problems.

On the other hand, the situation is entirely different with, for example, basaltic glasses or other glasses which have a particularly high melting point. For these, the devitrification temperature is far higher than the temperature corresponding to the highest viscosity so that the working range is limited by the devitrification and drop resolution temperatures. And furthermore, the gap between these two temperatures is often far less than a hundred degrees or so and may even be 50° C., whereas a soft glass has a working range of more than 200–250° C.

Since furthermore the glass is melted at a temperature which is higher than the working temperatures, with a gap which becomes increasingly great the harder the glass is, which would tend to constitute an even greater complication of the problem, it therefore has to cool down during the operations which convey it from the furnace to the peripheral wall of the centrifuge. Thus, it is virtually impossible to work with a glass very accurately at a given temperature throughout its entire dwell time in the centrifuge and hitherto it has not been possible to treat this type of glass with an internal centrifugation technique capable of replacing the external centrifugation technique, the aforesaid drawbacks of which have nevertheless been known for a long time.

And furthermore, to this basic problem of rheological behavior are added other problems, these of a technological nature. Indeed, these glasses are particularly corrosive and it is therefore necessary, for manufacturing the centrifuge, to find a material which is capable of resisting chemical attack which becomes increasingly more rapid when the temperature and rates of flow are particularly high. Furthermore, the size of the centrifuges, generally between 200 and 1000 mm in diameter, the vast number of outlet orifices and the shape which is designed with a view to withstanding intense mechanical stresses due to the rotation and plastic flow during long periods of use, do not make it possible to envisage constructing the centrifuge from refractory alloys, for example platinum. Various refractory steels are known in the literature pertaining to this art but all those which are suitable from the mechanical point of view have a maximum temperature of use (over a long period) of around 1000° C. while a temperature of 1100–1200° C. would be desirable.

SUMMARY OF THE INVENTION

The present invention has as an object to improve the techniques of mineral fiber production by the internal centrifugation method, with a view to widening the range of glasses capable of being drawn in this way under satisfactory industrial conditions. The invention likewise has as object a new centrifuge for carrying out the method according to the invention.

The method according to the invention includes the steps of pouring the material in the molten state onto the inside of a centrifuge whose peripheral band is pierced by a very large number of outlet orifices, the inside wall of the peripheral band being at a significantly higher temperature than the outer wall. The method according to the invention thus operates with a considerable temperature gradient from the inside to the outside.

According to the glasses used, the temperature gradient will advantageously be chosen to be between 50 and 300° C. and will preferably be between 100 and 200° C, for a wall thickness of a few millimeters, preferably 5 mm.

This temperature gradient is advantageously such that the internal temperature is much higher than the temperature at which the material to be drawn out into fibers starts to devitrify, while the outside temperature is sufficiently low that the viscosity of the glass is fairly high at the moment the fibers are being drawn.

With a basaltic glass or any other glass the working temperature range of which is particularly narrow, therefore, it will be necessary to work inside the centrifuge with a glass the temperature of which is generally greater than the drop resolution temperature. But at such time as the glass filament emerges through one of the outlet orifices of the centrifuge, its temperature will be just within this working range where the viscosity will be adequate for fiber drawing. Subject to a very accurate thermal conditioning of the centrifuge, achieved by suitable supplies of internal and external heat, for example by means of annular burners, the invention thus makes it possible to resolve this problem of thermal conditioning of basaltic glasses.

In the method according to the invention, the filaments are drawn out just at the periphery of the centrifuge, therefore at a moment when adequate viscosity is obtained. Thus it is possible to draw out any kind of glass even if its working range is substantially non-existent, and this with no fear of any blockage forming inside the centrifuge due to a mass of glass devitrifying and setting, and it is immaterial whether the viscosity of the glass increases abruptly just after the filament has emerged.

An advantage of the method according to the invention is also probably linked to the fact that over the major part of its path through the orifices, the glass is still very fluid and it therefore has a high rate of flow which remains high throughout this entire path. Therefore, not only is any danger of devitrification inside the centrifuge overcome but furthermore the dwell times of the glass in the orifices are very short, which is also favorable from the point of view of devitrification.

The invention makes it possible, for example, to work with natural rocks, particularly basalts, which do not require the addition of fusion agents and therefore their manufacturing cost is less than that of sodic glass; furthermore, they are advantageously refractory and lead to a wool being obtained which enjoys an improved high temperature resistance, which can be used for high temperature insulation or for fire-check products.

The fibers may be drawn out purely by centrifuge and in this case the centrifuge is surrounded by a gaseous flow of not very high velocity, serving for the thermal conditioning of the outer peripheral band and of the filaments, this flow possibly being backed up at a greater distance by streams produced by an annular ring and intended to break up the fibers and entrain them towards the fiber drawing hood. It is also possible to work with a gaseous drawing system to back up centrifugal force, due to the action of a flow of gas at very high velocity, this flow of gas then serving not only as a thermal conditioning but also as a fluid drawing means.

It should be noted that although a thermal gradient is necessary radially, this does not mean—on the contrary— that there is nothing to be gained from maintaining the internal and external walls as far as possible isothermic, the fibers emanating from filaments escaping through orifices in the bottom of the peripheral band being required to have a "history" which is as close as possible to that of those fibers which are expressed from the top of the peripheral band.

The inventors have likewise developed a centrifuge for carrying out the invention, that is to say a centrifuge which is capable of working with a temperature gradient according to the thickness of the wall of the peripheral band. This first object is satisfied by a centrifuge of which the peripheral band is made from a material such that the thermal conductivity, measured parallel with a radius of the centrifuge, is at least below 20 $W^{-1}C^{-1}$ at 1000° C. and preferably less than 10 $W^{-1}C^{-1}$ and of which the thermal diffusivity, still measured parallel with the radius and at 1000° C, is preferably less than $5 \times 10^{-6}$ $M^2s^{-1}$, this material being furthermore to be capable of withstanding a particularly high internal temperature compatible with the melting temperatures of glasses such as for example natural basalts. As these temperatures are higher than 1000° C., that is to say at the current limit of use of refractory steels. the present inventors turned towards ceramic materials.

In the study of materials capable of being used to this end. there are several criteria which have to be taken into account. Firstly, it is vital that the ceramic not be corroded by virtue of oxidation by the molten material whatever this may be, and therefore particularly if it is a particularly corrosive material of the basaltic glass and/or blast furnace slag type. The mechanical strength of the piece must likewise be as high as possible, even if it is well known that ceramics generally have a strength level which is about ten times below that of metals. Finally, the resistance to thermal shocks must be high, in other words the expansion coefficient of the piece must be as low as possible.

This last mentioned point immediately reveals the problem of choice of the bond between the ceramic parts of the centrifuge and the metallic parts such as the parts for coupling to the motor shaft which causes the centrifuge to rotate, these parts necessarily becoming heated and therefore expanding even though it is possible to maintain their temperature at just a few hundred degrees.

Multiple tests have been conducted on ceramic materials which are all known as withstanding working temperatures in excess of 1000° C. by comparing their performance over various criteria which are particularly critical in the case of a fiber drawing centrifuge, which are in particular the capacity to withstand thermal shocks (stoppage of the pouring of molten glass sometimes occurring quite unexpectedly, resulting in an abrupt diminution of added heat). a high mechanical strength (the centrifuge is subject to intense mechanical stresses due to the speed of rotation which is furthermore quite prolonged) and as indicated previously satisfactory resistance to corrosion from the glasses.

Among monolithic ceramics, the basic advantage of which is the possibility of making them by sintering, a technique which is well known to those skilled in the art, the present inventors finally set aside the chrome oxide based ceramics which, while being currently used in glass furnaces, are unsuitable by virtue of their poor resistance to thermal shocks. Other ceramics such as mullite, cordierite or aluminum titanate offer quite inadequate mechanical strength. Nor does silicon carbide prove satisfactory either because its resistance to thermal shocks is inadequate. Although very similar to silicon carbide by virtue of a number of their various characteristic features, the silicon nitride family was recognized by the present inventors as being the only material suitable for monolith pieces, so long as the work was carried out with certain precautions which are enumerated hereinafter.

The silicon nitride ceramics used are grey in color. In particular, silicon nitride or its derivatives such as SIALON were used, SIALON for example satisfying the following chemical composition, expressed by volume:

| Si | 49.4% |
|---|---|
| Al | 4.2% |
| Y | 7.25% |
| O | 4% |
| N | 35% |
| Fe | <2000 ppm |
| Ca + Mg | <1000 ppm |

Other silicon nitrides may also be used.

The resulting piece is obtained for example by sintering. Preferably, non-porous ceramics are used, their apparent density being as close as possible to their maximum theoretical density, which produces parts which are less easily corroded. Such a ceramic material offers good resistance to oxidation by atmospheric oxygen. This good behavior is explained by the formation of a protective coating of silica on the surface of the ceramic part due to surface oxidation. With molten glasses, it is particularly advantageous to work with a molten material the composition of which is relatively acid, that is to say with a relatively high acid element content, such as alumina, boron, silica and phosphorous, in order to limit corrosion phenomena.

Another category of ceramic materials studied is that of composite materials having a ceramic matrix and fibrous reinforcements which exhibit a strength which is substantially enhanced in comparison with that of monolithic ceramics, particularly SiC-SiC or SIC-C ceramics having a silicon carbide matrix reinforced by fibers which are themselves of silicon carbide (SiC-SiC) or of carbon (SiC-C). For more details about these materials, reference is made for example to the article by Mr. Alain LACOMBE entitled "Les materiaux ceramiques á matrice ceramique" (Ceramic materials having a ceramic matrix) published in the June 1989 number of the magazine "Materiaux et Techniques". The part is produced by impregnation by cracking of a gaseous precursor ceramized during deposition in a preform obtained by preparing a contacting stack of layers of silicon carbide or carbon fibers. Techniques similar to those developed for polymeric composite materials permit such parts to be manufactured industrially, including parts of relatively large diameter, for example those exceeding 600 mm.

It can be noted that the ceramic material used has a very low tendency to plastic flow compared with that of metallic materials at the temperatures involved here. The shape of the centrifuge may be somewhat simplified and rounded because even with a high rate of rotation the levels of constraint generally do not exceed the elastic limit of the material. The reinforcing fibers make it possible to generate an energy-absorbing mechanism which limits propagation of micro-cracks and permits a certain elastic deformation. Such a ceramic material can work in non-oxidizing conditions at a temperature greater than 1200° C. in the case of SiC-SiC and 1400° C. for SiC-C. The orifices through which the glass escapes may be obtained by laser piercing.

With a SiC-SiC ceramic, one has a material which is particularly remarkable due to its strength which is of the order of 30 MPa/m which gives it a good resistance to thermal shock. Brought into contact with a glass containing oxygen or oxygen in the air, the silicon carbide oxidizes and as in the case of silicon nitride a passive protective layer of silica forms.

However, it must be noted that this passivation phenomenon is not entirely neutral and that it results in the selection of particular glass-making formulations. First and foremost, the silica can be solubilized by the glass and it is therefore necessary to avoid the glass washing along the centrifuge.

Earlier. we indicated the possibility of laser piercing. It has been found that this method of piercing leaves a perfectly smooth surface with a very small number of fibers laid bare, the deterioration of which during passage of the thread of molten glass is surprisingly limited in depth although the fibers have a corrosion resistance which is less than that of the matrix. Consequently, it is sufficient initially to work with orifices which are pierced to a slightly smaller diameter than that required and after a widening of the orifices which occurs during the first moments of pouring, it is found that the diameter of the orifices remains constant and that therefore there is no rapid wear and tear on the centrifuge.

Another remarkable characteristic of SiC-SiC ceramics is their thermal conductivity which is far lower than that of refractory steels, and which is combined with a very low diffusivity coefficient which accompanies a fairly low thermal inertia due to a density which is only around 2.5. In the thickness, and therefore in the plane at right-angles to the planes of the layers of fabric, the thermal conductivity is of the order of 4 to 5 $Wm^{-1}C^{-1}$, whereas for a single temperature of 1000° C. this thermal conductivity is around 22 $Wm^{-1}C^{-1}$ for a refractory steel used for conventional centrifuges, refractory steels which are nevertheless very poor heat conductors compared with ordinary steels. In addition, this low density means that the centrifuges thus produced are remarkably light, which means less effort has to be supplied by the motor shaft and there is less stress on the assembly means. But referring again to behavior under heat, it is found that a SiC-SiC ceramic is quite particularly suitable for application of the method according to the invention in so far as it does not really have any tendency to homogenize its temperature, even after a relatively long time. Therefore, it is possible to work with a temperature gradient which shows little change and which can therefore be maintained without having to overheat the inner part of the centrifuge.

A more negative aspect of this particular behavior is that it is especially difficult to preheat the centrifuge when the fiber drawing process is being started up; however, it has been found that an isothermal heating over the entire height of the peripheral band, but not according to the thickness, may be obtained by means of an annular burner preferably having a plurality of diverging jets which are directed towards the inner wall of the peripheral band and external burners, possibly completed by one or more oxyacetylene torches. The heating should be continuously monitored, for example by means of a visual pyrometer, in order to avoid any overheating. Preheating by an internal burner makes it possible to reduce the number of zones which are in tension, more particularly at the level of all the piercing orifices.

Ceramics having a silicon carbide matrix reinforced by carbon fibers are likewise quite particularly advantageous, their performance from the point of view of their resistance to high temperature, their strength, their thermal conductivity and their use being very comparable with, perhaps even slightly greater than, those of ceramics reinforced by silicon carbide fibers. These carbon fiber reinforced ceramics are furthermore good conductors of electricity which possibly makes it feasible to have heating by electromagnetic induction. It is however advantageous to provide for the centrifuge to be protected, for example by a ceramization type of process, with a thin coating of silicon carbide or any other equivalent coating which will advantageously protect the fibers which are exposed. If the glass chosen is sufficiently reducing, it may be possible to do without this protective ceramization treatment but then the centrifuge will be preheated by burners emitting reduced gases.

A final point is that of the connection between the ceramic part and the vital metallic parts of the centrifuge which must be connected to its driving shaft in one way or another. This connection may be provided for example by locking the flat returned edge of the ceramic part between two metal flanges fixed to each other, metal to metal, interposing between the ceramic part and the metal flanges flexible seals for example in the form of alumina fiber felts or felts of other refractory fibers or in the form of exfoliated graphite paper. This flexible fixing permits of relative slip between the metal parts which expand enormously and the ceramic part which undergoes virtually no expansion. This connecting means is supplemented by a centering device which may advantageously consist of a set of three ceramic studs carried on one of the metal flanges, studs which are positioned in radial oblong seatings disposed on the return edge of the ceramic part and which are regularly spaced apart at angles of 120°.

BRIEF DESCRIPTION OF THE DRAWINGS

Further details and advantageous characteristic features of the invention will emerge from the description which is given hereinafter with reference to the attached drawings in which:

FIG. 1 shows the viscosity-temperature curves for the various glasses;

FIG. 2 is a diagram illustrating the fiber drawing process according to the invention;

FIG. 3 is a diagrammatic half-view through a centrifuge according to the invention.

DETAILED DESCRIPTION OF THE PREFERRED EMBODIMENTS

The insulation fiber industry produces essentially two types of product, glass wool and rock wool, each of these types being of course available in a wide number of alternative forms. Typically, glass wool is obtained from a glass composition which falls within the following limits:

| | |
|---|---|
| $SiO_2$ | 61–66 (percentage by weight) |
| $Na_2O$ | 12–17 |
| $Al_2O_3$ | 2–5 |
| $K_2O$ | 0–3 |
| CaO | 6–9 |
| $B_2O_3$ | 0–7.5 |
| MgO | 0–5 |
| $Fe_2O_3$ | less than 0.6 |

These limits are not always very strict and other constituents may likewise be considered, particularly in traces. The relatively high silica content compared with that of the other glasses implies a high content of melting additives, such as soda or boron. Soda (and even more so boron) is a relatively expensive constituent, the cost of the composition is furthermore greatly increased by constituents such as boron oxides. Furthermore, a glass of such a composition is plastic beyond 400–500° C. which limits its usage potential.

On the other hand, when one considers the viscosity-temperature curve of such a glass, shown at 1 in FIG. 1, it is found that viscosity is comprised between 300 and 3000 poises when the temperature is itself comprised between approx. 1050 and 1300° C. In this drawing, there are furthermore shaded areas which represent the ranges of temperatures which are below the upper temperatures of devitrification of the given glasses. Furthermore, the upper devitrification temperature is outside this range (960° C). The working range is therefore particularly extensive and these glasses lend themselves quite particularly to conversion to fibers because they can be worked for relatively long periods with highly optimized drawing conditions which result in particularly high quality fibers, particularly in consideration of the thermal and mechanical properties, essential properties which one seeks to obtain when producing an insulating product.

The second type of product is rock wool, so called because it is often produced from natural rocks of the basalt type while other compositions are of products derived from the metal working industry, such as blast furnace slags, are likewise used. These glass-making compositions, obtained without any addition of soda in particular, and therefore less expensive, comply for instance with the following compositions which are expressed as percentages by weight, references 2, 3 and 4 relating to the corresponding viscosity-temperature curves proposed in FIG. 1 in which the temperatures are shown on the abscissa while the decimal logarithms of the viscosities expressed in poises (1 poise =1 dPas) are shown on the ordinates.

|                                | General case | (2)  | (3)  | (4)  |
| ------------------------------ | ------------ | ---- | ---- | ---- |
| $SiO_2$                        | 40-54        | 52.0 | 44.5 | 46.6 |
| $Na_2O$                        | 0-5          | 4.4  | 4.2  | 3.2  |
| $Al_2O_3$                      | 8-18         | 16.9 | 14.7 | 13.7 |
| $K_2O$                         | 0-2          | 0.6  | 0.9  | 1.5  |
| CaO                            | 7-42         | 7.6  | 10.5 | 10.3 |
| MgO                            | 3-11         | 7.3  | 8.9  | 9.1  |
| $Fe_2O_3$                      | 0-17         | 10.1 | 12.5 | 12.6 |
| Misc.                          |              | 1.3  | 3.8  | 3    |

These values correspond to relatively refractory glasses which may therefore be advantageously used in high temperature applications or for the construction of elements intended to delay propagation of a fire in a building. But this refractory characteristic is in the first instance bought at the expense of a very high melting temperature, higher than 1400° C. for example, which often results in the use of fairly rough methods of melting, for example in a cupola with coke as the fuel, so that the heat treatment of the glass is often imprecise.

Before coming to the question of rheological behavior, it is necessary furthermore to stress that these glasses similarly pose particular problems of chemical corrosion and that the choice of a given glass must likewise take into account the aspect of corrosion of the tools used for drawing out the fibers. With silicon-based materials such as those mentioned previously, it is known that the glass will have a tendency to accentuate silica oxidation. That is why it is more particularly advantageous to use glass compositions of which the silica content is greater than 45% and preferably greater than 50% while the melting agent content (MgO-CaO) is less than 20% and preferably less than 15% (a composition which is to be found in certain silica-rich basalts but which remains particularly poor in silica if compared with current glasses so that it costs less than these latter). In addition to this still relatively low silica content, it is possible to use a low content of alkaline substances, that is to say melting additives. Furthermore, the content of oxidizing agents such as ferric or even ferrous oxides and sulphur must be as low as possible in order to have as acid a glass as possible, and therefore one which has on the one hand a low tendency to solubilize the silica by virtue of its low basic character and which on the other hand does not favor oxidation into silicon carbide, which is indeed useful when it is necessary to form a protective surface coating, but which is all the same the result of an attack on the centrifuge which must not progress as far as the heart of this latter.

The importance of this last point is for example demonstrated by the following test. A first test carried out with a basalt containing 45% silica and 12% ferric oxide showed that a bar of silicon nitride underwent a weight loss of 80% after 48 hours in a bath of molten glass at 1300° C, the weight loss being less than 5% after the same period in the case of an identical bar immersed in a bath of molten basalt satisfying a formulation identical to the aforesaid Meilleraie basalt. With an "ordinary" basalt the silica content of which is for example 63% while the $Na_2O$ content is 15%, a weight loss of less than 5% was observed after 125 hours at 1100° C. (temperature at which an "ordinary" glass is already fluid and which it is therefore pointless to exceed). Similar results are obtained with silicon carbide based ceramics.

The corrosion tests likewise show that it is preferable to use glass compositions which are free from sulphur or any compound tending to increase their basicity.

Concerning the problem of fiber drawing proper, if one compares the curves 2, 3 and 4 with curve 1, it will immediately noted that the working ranges of the basaltic glasses are remarkably narrow and that they are at far higher temperature levels. If one is confined to the theoretical limit fixed by the upper devitrification temperature and if a minimum viscosity of 100 poises is established, only the Meilleraie basalt corresponding to curve 2 may be used and this only within a range of scarcely 30° C. (1330-1360° C.).

In fact, this limit is really only a limit in so far as the period spent by the glass in the centrifuge is concerned, because the speed of fiber drawing and of cooling which is then carried out on the fiber is such that it is entirely possible to draw without devitrification taking place. To this end, it may be noted that the drawing out of fibers is conducted on a glass during the course of cooling while the upper devitrification temperature is measured on the basis of a devitrified glass. Therefore, there is no complete coincidence of limit temperatures but the closer the working temperature is to the upper devitrification temperature the greater is the risk that working may be impossible. In any event, it is imperative that the adequate viscosity be obtained at the instant the fibers are drawn out and that the glass not be at a temperature below the upper devitrification temperature inside the centrifuge.

Meilleraie basalt is the preferred basalt according to the invention because in addition to its more favorable rheological behavior it is less aggressive to ceramic centrifuges.

If one seeks to carry out drawing of one of these basaltic glasses into fibers by internal centrifugation under the conditions which are conventional for a metallic centrifuge and therefore with a wall which is virtually isothermal according to its thickness, an experience which can be tried with mirror glass, that is to say a glass of which the viscosity temperature curve can be superimposed on the basalt chosen but of which the forming range is comprised between considerably lower temperatures so that it is possible to operate with a metal centrifuge, a drop resolution phenomenon is encountered instead of a fiber drawing situation.

Nevertheless, in order to be able to proceed to draw out fibers of such a composition by means of a pierced centrifuge, it is proposed according to the invention and as is shown diagrammatically in FIG. 2, to proceed with a temperature gradient from the interior to the exterior of the wall. Thus, with the Meilleraie basalt, it is possible to send a jet of molten material which, in the situation illustrated, is at 1470° C. (the material is brought from the melting enclosure for instance by means of a spout which explains this fairly low temperature in relation to the melting temperature). The glass continues to cool as it drops down to reach the centrifuge.

With a centrifuge having an interior wall which is for example preheated around 1300° C., it will be possible thus to work with a glass which will itself be at a temperature of around 1350° C., excluding any risk of devitrification in the centrifuge, the fluidity of the material being too great for correct fiber drawing and resulting in resolution into drops instead of fibers. In contrast, the outer wall through which the filaments emerge is at a temperature close to 1140° C, corresponding to a viscosity which effectively permits of drawing either exclusively by virtue of centrifugal force or with the combined action of centrifugal force and gaseous drawing.

More generally, the method according to the invention makes it possible to draw out into fibers a very great number of glasses of which the rheological behavior is particularly critical by virtue of the narrowness of their working range, whether this is limited by problems of devitrification as in the case of basaltic glasses or whether it is solely due to viscosity problems when this latter decreases very greatly with the temperature. The term "narrow" is taken to mean for instance a difference of less than 100° C, in fact less than 50° C.

In order to carry out the method according to the invention, the present inventors have developed a new type of centrifuge capable of functioning with a temperature gradient which might be as much as 200° C for example between the inner and outer walls, although it must be understood that the centrifuge according to the invention is in no way limited to the case of applying the aforesaid method of drawing out fibers and that it may likewise be used under more isothermal conditions, with less refractory glass compositions and nevertheless offer a number of advantages which will be listed in greater detail hereinafter.

In order to establish a considerable temperature offset over a thickness which may not exceed 5 mm for example, it was vital to work with a material which is a good heat insulator and which has a low thermal inertia to oppose heat diffusion. Another constraint which is applied from the moment when the molten glass has to pass through the wall of the centrifuge is that this insulant may not be deposited simply in the form of a thin coating but must be used in order to produce the entire part; this condition means that the conditions of feasibility are subject both to the level of shaping of the parts and to the level of piercing. Furthermore, the material must be sufficiently refractory and continuously withstand temperatures comprised for example between 1200 and 1300° C and finally, last but the least demand, the material must be capable of withstanding corrosion from glasses.

The first type of material selected is silicon nitride, for example of the type RBSN (Reaction Bonded Silicon Nitride, obtained by sintering reaction under nitrogen from a silicon powder) of the type $Si_3N_4$ or SIALON type, a sintered material having good thermal properties up to temperatures close to 1300° C. and which is advantageously relatively easy to machine. Its mechanical strength at 1000° C. is 450 MPa and its linear expansion coefficient between 20 and 1000° C. is $3 \times 10^{-6} C^{-1}$. The heat conductivity of this material is 20 $Wm^{-1} \circ C^{-1}$ at 1000° C. which is in fact a very good insulator. Furthermore, this material has a density of around 3.2, a very low density associated with a low diffusivity. The sintering technique makes it possible to produce parts even of fairly complex shape, the orifices being capable of being made at the outset, in the rough, making them by means of little bars which are withdrawn once the part has been shaped, the diameter of the orifices possibly being rectified by a diamond.

It should be noted that the ceramic material used is of very low porosity, its apparent density being preferably greater than 97% of the maximum theoretical density. This condition, which it is fairly simple to check experimentally if it is satisfied, constitutes a non-destructive test of the quality of the part and is the sign of an almost total absence of faults, ensuring good resistance to plastic flow and good resistance to flexion.

Very satisfactory from the point of view of its resistance to thermal shock and its hardness, silicon nitride nevertheless has a relatively low level of strength (of around 5.4 MPa/m), which makes it difficult to produce large-diameter centrifuges having for example a diameter of 400 mm or more, centrifuges being by definition driven at high speed, with centrifugal accelerations comprised for instance between 4000 and 20,000 $m/s^2$ if one is in an advantageous situation from the point of view of the quality of fibers proposed by European Patent EP-BI-91 381.

That is why composite ceramics are preferably used, which have a silicon carbide matrix reinforced with silicon carbide fibers or carbon fibers, ceramics of which the strength levels are respectively of the order of 25-30 and 45-52 MPa/m, these latter values being far closer to those of metals. These composite ceramics do not therefore any longer exhibit the fragile character normally identified with this type of material.

These composites are obtained by working with preforms, forming stacks which are as compact as possible from layers of silicon carbide fiber or carbon tissue. The network of fibers then undergoes one or preferably a series of impregnations by infiltration in the vapor phase at high temperature in order to obtain pyrolytic cracking of the precursor; the precursor gas used being typically trichloro-methoxy-silane. After the matrix has been thus placed around the fibers, the blank is possibly machined for finishing and orifices are made for instance by means of laser piercing.

The mechanical strength of these materials is all the more remarkable since in itself silicon carbide is slightly less tough than silicon nitride which explains why this material has not been chosen for the production of sintered parts. Therefore, a fragile-fragile type composite is obtained, the exceptional mechanical strength of which is due to the presence of the fibers which prevent the propagation of fissures, the energy of the shock is dissipated by multiple microfissures and absorbed by the fiber-matrix interface, without any great propagation of the primary fissures.

For a SiC-SiC ceramic, the mechanical performance figures are as follows: strength under tension 200 MPa at 1000° C., this strength being limited to 150 MPa at 1400° C. resulting for practical purposes in a limit temperature of use of between 1200 and 1300° C., a Young's modulus of 200 GPa at 1000° C., 170 GPa at 1400° C., a resistance to compression in the thickness (at right-angles to the layers of tissue) of 380 to 250 MPa, in the plane of the tissue layers of 480 to 300 MPa.

Even better values are obtained with a SiC-C ceramic, the figures being given here for temperatures of 1000 and 1400° C. respectively, resistance under traction 350 MPa (330 MPa), Young's modulus 100 GPa (100 GPa), compression strength—in the thickness 450 MPa (500 MPa) and in the plane 600 MPa (700 MPa).

Parts made from composite ceramics are not isotropic, their properties being different according to whether they are measured parallel with or at right-angles to the layers of tissue, these being disposed parallel with the peripheral wall of the centrifuge, which is all the more advantageous within the framework of application of the method according to the invention which is in fact in the thickness, at right-angles to the layers of tissue, the greater is the thermal conductivity of the material since the fibrous network cannot serve as a heat conductor. It should be noted on the other hand that the greater thermal conductivity in the plane of the layers of tissue is rather advantageous since it helps the non-formation of heat gradients according to the height of the band.

More precisely, for a 40% fiber content, a SiC-SiC ceramic has for a temperature comprised between 1000 and 1400° C. a constant thermal diffusivity of $5 \times 10^6$ $M^2 s^{-1}$ in the plane parallel with the layers of tissue and in the direction at right-angles to this plane of $2 \times 10^2$ $s^{-1}$. The phenomenon is even more accentuated with a ceramic reinforced with conductive carbon fibers where the thermal diffusivity between 1000 and 1400° C. is respectively $7-8 \times 10^6 M^2 s^{-1}$ in the parallel plane and $2 \times 10^6 M^2 s^{-1}$ in the thickness, the heat conductivity being 17 WmK in the thickness and 33 WmK in the plane. This very low diffusivity is accompanied as with silicon nitride by very low density which is respectively 2.5 for a SiC-SiC ceramic and 2.1 for a SIC-C ceramic, a density which results in the production of very light weight parts which are therefore easier to cause to rotate.

Mechanically and thermally, the SiC-C ceramics have performance levels which are superior to those of SiC-SiC ceramics. Nevertheless, the production of centrifuges of all-silicon carbide ceramic is easier, the SiC fibers which are exposed during piercing of the orifices being capable of being brought into contact with molten glass which is not the case with carbon fibers which would be converted to carbon dioxide whereas the silicon carbide fibers are eroded like the matrix, however with a kinetic deterioration reaction which may be a little more rapid by virtue of the fineness of the fibers, the silicon carbide being converted to silicon which then constitutes a protective coating. In order to use a SiC-C ceramic, it is therefore necessary to proceed with a treatment to protect orifices which are pierced through the wall, for example ceramization by silicon carbide or some other ceramic deposited in a thin coating which will resist corrosion from the glasses.

FIG. 3 diagrammatically shows a complete assembly of a centrifuge according to the invention, in this case particularly constructed from an SiC-SiC ceramic. The term ceramic centrifuge is intended simply to imply that part of the centrifuge which is likely to come in contact with the molten glass or which is likely to be attacked directly by the high-temperature gaseous environment. All the other parts are preferably metallic on grounds of cost and viability. The ceramic part proper is therefore constituted by a toric section 5, subdivided into three parts: the actual peripheral band 6 in which there are for instance 20,000 orifices having a diameter comprised for example between 0.2-0.7 mm and preferably around 0.5 mm for a centrifuge 400 mm in diameter, for a band height of around 50 mm. The toric section 5 likewise comprises a return 7 which imparts good mechanical strength to the part and a flat portion 8 which receives the stream of molten glass 9 and where there may possibly be a reserve of molten glass. This portion 8 which therefore constitutes the bottom of the centrifuge is fixed to a metal hub by a fixing method described in detail hereinafter. The diagram shown is not fully in accordance with an actual part, the corners of which are preferably more slightly rounded but it does make it possible to see that the parts according to the invention have fairly clean lines, local reinforcing elements not being needed here due to the fact that the ceramic part undergoes virtually no expansion. In particular, there is no need, as in the case of metal centrifuges, to provide a "tulip"-shaped inclined part as plastic flow phenomena are not observed or at least do not result in any significant deformation.

This aspect of ceramic centrifuges according to the invention is independent of the manner in which the fibers are drawn out and the glass composition used and explains the interest of this new type of centrifuge even with conventional fiber drawing and composition. Indeed, it is well known that plastic flow in a metal centrifuge gives rise to a modification in the conditions under which fibers are formed, the filaments being for example emitted at a distance closer to the fiber drawing burner. Any change in the fiber-forming conditions is accompanied by a slight change in the quality of the fibers, for example a variation in their diameter, which is considered as being negative because its objective is generally perfect consistency of quality.

On the other hand, we previously mentioned a height of the peripheral band of around 50 mm, but this height may be increased to a fairly large degree. Indeed, it is a height which is difficult to exceed with a metal centrifuge, in so far as, in order to supply all the orifices, it would be necessary to increase the centrifugal force and therefore the speed of rotation of the centrifuge and, secondarily, the tensions which are exerted on the centrifuge which, at a certain level, results in the elastic limit of the material being exceeded and irreversible deformation occurring. It is evident that with a centrifuge which does not become deformed, the speed of rotation may be increased quite considerably. The more so since the ceramics selected according to the invention have very low densities and therefore exert lesser stresses on the other parts, particularly on the shaft and the hub.

To conclude comment on this conventional aspect of fiber drawing, it is possible finally to remark that the centrifuges according to the invention, as they are capable of withstanding higher temperatures than the metal centrifuges, mean it is possible likewise to choose to work with glasses of ordinary composition but which are slightly hotter and therefore more fluid, requiring less energy during gaseous drawing, so accentuating the part which centrifugation plays in fiber drawing.

Referring to FIG. 3 and more precisely to the problem of the connection between the metal hub 9 which is directly rotated by the motor shaft 10 and the bottom 8, the fixing must take three vital factors into account: a flexible connection which allows for the difference in expansion between the metal parts and the ceramic parts, a perfect centering of the centrifuge, the peripheral velocity of which is for example greater than 50 ms$^{-1}$ and is preferably between 50 and 90 ms$^{-1}$ in order to restore the advantageous conditions known from EP-B-91 866, and finally in order not to have a ceramic material working under tension but always under compression.

These imperatives are satisfied for example by the connection proposed here but quite obviously other assembly arrangements may likewise be envisaged in so far as they take the aforesaid imperatives properly into consideration. For this, at least three regularly spaced oblong seatings 11 are provided on the underside of the bottom 8. These oblong seatings are occupied by ceramic studs 12 which are sweated hot into the metal hub 9, sweating permitting an extremely accurate positioning. These studs are displaced radially when the hub 9 expands and so ensure satisfactory centering of the centrifuge. Furthermore, the bottom 8 is held captive by a circular metal flange 13 fixed to the hub 9, for example by bolts 14, in a metal-to-metal fixing. The clearance between the bottom 8 and the flange 13, and the hub 9 is filled by a refractory seal which supports the ceramic part by squeezing without gripping, so that the stress is spread over a very large area. To achieve this, it is possible to use a felt of alumina fibers or other refractory fibers; nevertheless, graphite seals are preferred, particularly those of exfoliated graphite paper which are flexible and which can thus reversibly follow any deformations in the parts; graphite may be used here because it is enclosed in a closed space without renewal of the air.

The centrifuge is surrounded by burners which are used for preheating, for maintaining temperature and for setting up a heated environment and/or gaseous drawing currents which extend along the peripheral wall. The interior wall of the peripheral band is heated by interior burners 15 which are mounted in a ring, these interior burners preferably being divergent jet burners in order to cover the entire height of the wall. The outer wall is heated by the lip 16 of an annular burner 17. Furthermore, it may be advantageous likewise to have available a movable ramp of external burners which are used outside the preheating situation and which are withdrawn as soon as the pouring of molten glass starts.

Preheating is carried out while following a temperature rise curve which takes into account the resistance of the ceramic material to thermal shocks. A wall temperature of, for example at least greater than 1000° C. is required before pouring starts if it is desired to carry out fiber drawing at a centrifuge temperature between 1200 and 1300° C. In order to avoid the appearance of excessive thermal gradients, this preheating must be carried out under conditions which are as isothermal as possible, viewed in cross-sections through the thickness therefore parallel with the layers of woven material in the case of a composite ceramic; the problem posed here is linked to the very low thermal diffusivity of the ceramics which for practical purposes do not transmit heat received at one point to the adjacent parts. By virtue of the presence of the orifices through which the gases from the burner locally open up a path through the wall, it is therefore advantageous to preheat the centrifuge both externally and internally, the internal heating starting for instance when a temperature of 500 to 600° C. is attained. Furthermore, internal heating makes it possibly to minimize the cooling effects due to convection.

During the fiber drawing phase, the outer annular burner 17 must preferably be capable of emitting gaseous currents the temperature of which corresponds to the temperature desired for the outer wall of the peripheral band and the velocity of which is at least equal to the peripheral velocity of the centrifuge. In other words, referring again the aforesaid example, it must be at least equal to 50 ms$^{-1}$. These currents are emitted substantially at right-angles to the glass filaments thus helping the drawing out and entraining them towards the fiber-receiving apparatus. To avoid a number of filaments failing to pursue their horizontal travel beyond the zone defined by these gaseous currents, the fiber drawing device is furthermore augmented by a blower ring 18 which, through an aperture 19, emits relatively high speed jets, at a temperature below the temperature required for gaseous drawing and which, in manner well known in this art, results in the filaments being broken up into fibers, assisting their fall.

With such an installation, it is possible to draw out a very wide range of glasses into fibers, the said glasses corresponding to compositions the silica content of which may vary for instance between 50 and 70% which makes it possible to produce a very wide range of products, the possible use of natural rock without added soda, and with a fiber quality at least equal to the current quality of fibers obtained by internal centrifugation.

Furthermore, the centrifuge according to the invention may operate with a temperature gradient through the thickness thereof (therefore at right-angles to the layers of woven material), possibly as much as 200° C. for example, such a gradient making it possible without difficulty to establish the temperature profile of FIG. 1. Therefore, this temperature profile has made it possible to draw out under satisfactory conditions fibers from Meilleraie basalt of the above-indicated composition. The coarser fibers (diameters 30 and 35 microns) were obtained at the rate of 30 kg per day and per orifice, these results being achieved with a virtually nil unfibered content, which is particularly remarkable for a basaltic glass. The smallest diameter fibers can be produced at the rate of 0.1 kg per day and per orifice, and a glass having a viscosity-temperature curve corresponding to curve 1, and very fine fibers having a mean diameter of 1.75 microns have been obtained. All the other intermediate values are capable of being produced, the amount drawn per day and per orifice varying between the values indicated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of obtaining mineral fibers by internal centrifugation, comprising the steps of:
    pouring a material to be drawn out into fibers, the material having a narrow range between the upper devitrification temperature and the drop resolution temperature, in a molten state, into the interior of a rotating centrifuge having a peripheral band pierced with a plural number of outlet orifices, such that the material may be drawn through the orifices to form fibers;

maintaining an interior wall at an elevated temperature above the upper range of the devitrification temperature of the material such that the material in the centrifuge is above the upper range of the devitrification temperature and maintaining and outer wall of the peripheral band at a temperature lower than that of the interior wall and selected such that the fibers emerging from the orifices are below a drop resolution temperature of the material, whereby there exists a temperature gradient between the interior and outer walls; and permitting the material to be drawn through the orifices to form the fibers.

2. A method of obtaining mineral fibers according to claim 1, wherein said peripheral band is ceramic and the temperature gradient between the inner and outer walls is between 50 and 300° C.

3. The method of claim 1 wherein said material is basalt.

4. A method of obtaining mineral fibers according to claim 1, wherein the inner wall and the outer wall are isothermal over the entire axial height of the peripheral band.

5. A method according to claim 1, wherein the material has a working range less than 100° C. in width.

6. A method according to claim I, wherein the material has a working range of which is above 1100° C.

7. A method according to claim 1, wherein the material is a glass having a silica content greater than 45% by weight and a lime content less than 20% by weight.

8. A method according to claim 1, wherein the material is Meilleraie basalt.

* * * * *